United States Patent Office 3,416,893
Patented Dec. 17, 1968

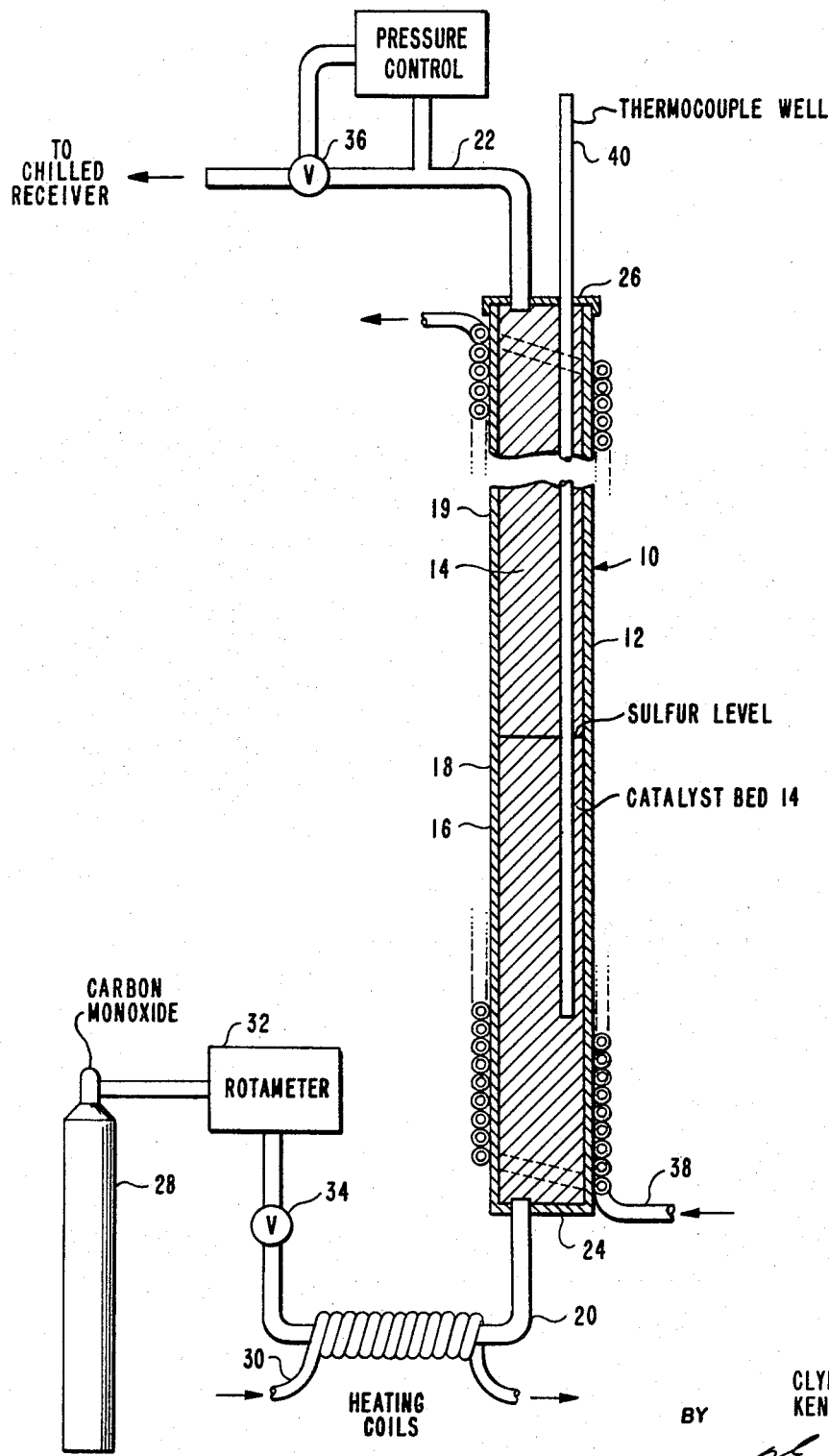

3,416,893
PREPARATION OF CARBONYL SULFIDE
Clyde E. Parish and Kenneth W. Urmy, Houston, Tex.,
assignors to Signal Oil and Gas Company, Los Angeles,
Calif.,
Filed Mar. 16, 1966, Ser. No. 534,891
9 Claims. (Cl. 23—203)

ABSTRACT OF THE DISCLOSURE

Carbonyl sulfide is prepared by reacting carbon monoxide and fluidized sulfur in the presence of a sulfided cobalt, molybdenum or cobalt-molybdenum catalyst at a temperature between about 250 and about 400° F. and at a pressure between about 100 and about 400 p.s.i.g.

---

The present invention generally relates to the preparation of carbonyl sulfide and more particularly relates to an improved low temperature method of preparing carbonyl sulfide by catalyzed reaction between carbon monoxide and sulfur under fluidized conditions.

Carbonyl sulfide is a valuable reagent for a variety of reactions. It is also a contaminant of certain petroleum refinery streams. Considerable attention has been directed in the past to methods of removal of carbonyl sulfide from petroleum refinery streams and for the preparation of carbonyl sulfide by synthesis. Carbonyl sulfide as a reagent has particular application to the preparation of various chemical products, including carbonates, ureas, substituted ureas, urethanes, carbamates and the like.

Conventional methods of preparing carbonyl sulfide, other than by recovering the same as a contaminant from refinery streams, are characterized either by high temperature reaction conditions of the order of magnitude of, for example, about 600° C. and above, or by low temperature reaction conditions in the presence of a suitable absorbing medium or adsorbing medium, such as an amine, for example, an hydroxy-substituted tertiary aliphatic amine, or a monohydric or polyhydric aliphatic alcohol or the like. Only negligible amounts of carbonyl sulfide have been formed by previous techniques involving reaction of carbon monoxide and sulfur at low temperatures of the order of 130–240° C. Such methods have never been used for the commercial preparation of carbonyl sulfide. It will be understood that the requirement of either a relatively high temperature, of the order of about 600° C. or more, or the presence of a selective absorbing or adsorbing medium such as selected aliphatic amines, selected aliphatic alcohols and the like, in the synthesis of carbonyl sulfide, imposes substantial limitations with respect to the rate of production of the carbonyl sulfide and substantially increases the cost of such preparation, as well as the necessary manipulative steps and the equipment required.

Accordingly, it would be desirable to provide an inexpensive method of efficiently synthesizing carbonyl sulfide, preferably in a continuous manner, without requiring the use of special selective absorbents and adsorbents, or high temperatures. Such method should be capable of being carried out in a few simple steps utilizing uncomplicated equipment.

Accordingly, the principal object of the present invention is to provide an inexpensive yet efficient method of preparing carbonyl sulfide in high yield.

It is also an object of the present invention to provide an improved method of preparing carbonyl sulfide from readily available reactants and utilizing simplified equipment and steps.

It is another object of the present invention to provide an improved method of synthesizing carbonyl sulfide on a continuous basis.

It is a further object of the present invention to provide an improved method of efficiently synthesizing carbonyl sulfide at relatively low temperature and in the absence of special absorbing and adsorbing media.

The foregoing objects are achieved, in accordance with the present invention, by the present improved method. This method comprises reacting carbon monoxide gas and fluidized sulfur in a reaction zone in the absence of a selective absorbing medium or adsorbing medium and at a relatively low temperature of, for example, between about 250° F. and about 350° F. in the presence of a readily available inexpensive metallic catalyst. Carbonyl sulfide is recovered in high yield from the gaseous effluent from the reaction zone. The method can be carried out at relatively high flow rates, under any suitable pressure below that which tends to liquefy the carbonyl sulfide product (and thereby complicate the recovery thereof), and a low temperature sufficient to fluidize the sulfur but which is insufficient, with respect to the pressure, to vaporize a substantial portion of the sulfur in the system and thereby complicate recovery of the carbonyl sulfide. It has been found that the present method is simple, inexpensive and particularly adapted for continuous operation and may utilize a wide variety of selected metallic catalysts in the form of metallic sulfides, for example, cobalt sulfide, cobalt-molybdenum sulfide and the like.

As a specific example, a reaction zone comprising a steel pipe with a one inch internal diameter and 18 inches in length and containing a granular cobalt-molybdenum catalyst having the following analysis: cobalt oxide—3.3 to 3.8 weight percent, molybdenum trioxide—13.5 to 15.5 weight percent, was used. The lower portion of the pipe was filled with a mixture of the catalyst and granular sulfur. The uppermost portion of the pipe contained a smaller concentration of sulfur with the catalyst. The total catalyst content in the pipe was approximately 28 milliliters, and the total sulfur content in the pipe was about 160 grams. The pipe was sealed at both the bottom and the top. A heated line passing from a rotameter connected to a presurized source of carbon monoxide gas was connected into the bottom of the pipe, with access to the interior thereof. The upper end of the pipe was connected to an effluent gas line containing a three-way valve and passing to a chilled receiver. The pipe was surrounded by a heating tape and was also supplied with a thermocouple.

Before the desired reaction was initiated, the pipe was purged with nitrogen gas at 275° F. Pressure in the pipe was then increased to about 200 p.s.i.g., at which time the nitrogen purge was cut off and carbon monoxide gas was passed into the bottom of the pipe through the heated line from the rotameter. The carbon monoxide gas contacted fluidized sulfur and catalyst in the pipe at about 275° F. and 200 p.s.i.g. The carbon monoxide flow rate into the pipe was established and maintained at about 1 s.c.f. per hour and gaseous effluent was removed continuously from the top of the pipe through the effluent line and passed to a chilled receiver wherein the carbonyl sulfide content of the effluent was periodically analyzed. It was found that carbonyl sulfide was generated continuously during the operation of the method over a period of two hours, and in a concentration in the effluent of about 22.5 weight percent. The remainder of the effluent gas comprised unreacted carbon monoxide and a minor concentration of vaporized sulfur together with negligible concentrations of various carbonyls other than carbonyl sulfide.

Further objects and advantages of the present invention will be apparent from a study of the following detailed description and the accompanying drawings of which:

The single figure is a schematic flow diagram of a typical arrangement utilized in carrying out the method of the present invention.

Now referring more particularly to the accompanying drawing, the single figure schematically illustrates typical equipment suitable for carrying out the present method. As shown in the single figure, a reaction zone 10 is provided which may comprise a hollow tubular reactor 12, a portion of which is broken away to illustrate the contents thereof. In this regard, the reactor 12 may be any suitable steel or other type of durable reactor vessel of any suitable size capable of being pressurized, and capable of containing an adequate quantity of the catalyst and sulfur for the desired reaction to produce carbonyl sulfide. Preferably, as schematically shown in the single figure, the reactor 12 employs a fixed bed of catalyst 14.

In the illustrated reactor 12, the catalyst 14 in particulate form is present in the lower portion 16 thereof in admixture with particulate sulfur 18. The upper portion of the reactor 12 contains the catalyst 14 with no sulfur admixed therewith. Alternatively, the sulfur 18 can be uniformly distributed throughout the catalyst 14 in the reactor 12 or can be employed in a higher concentration in a given portion (for example, the lower portion 16) of the reactor 12. The catalyst 14 can be in any suitable concentration with respect to the sulfur 18. For example, the catalyst can be present in a ratio of about 28–200 milliliters per 100–400 grams of sulfur or in any other suitable ratio. There should be present in the reactor 12 a sufficient concentration of the catalyst 14 to adequately catalyze the reaction between the sulfur 18 and carbon monoxide under the conditions maintained in the reaction zone (reactor 12) and there should be an amount of the sulfur 18 sufficient to react with the carbon monoxide to provide the desired total amount of carbonyl sulfide during the operating time of the reactor 12. Within these wide limitations any suitable ratio of the sulfur 18 to the catalyst 14, and any desired ratio of the sulfur-catalyst mixture to the carbon monoxide can be maintained.

The catalyst 14 is initially one or a mixture of metals and/or metallic salts and/or oxides supported on any suitable inert base, for example, an alumina, silica-alumina or silica base, and is normally present in granular or other finely divided particulate form of any desired size and shape. The metallic catalyst is either already sulfided and therefore is present as one or more metallic sulfides or is sulfided during the reaction in the reactor 12. The catalyst is capable of changing for one oxidation state to another. The catalyst can be, for example, any of the following: cobalt, cobalt oxide, cobalt sulfide, molybdenum, molybdenum oxide, molybdenum sulfide, and/or mixtures of any two or more of the same. Other suitable metals, oxides and/or sulfides can be utilized. Preferably, the catalyst is a mixture of cobalt oxide and molybdenum oxide disposed on an alumina base and pre-sulfided to convert the same to cobalt sulfide and molybdenum sulfide on alumina prior to use in the reactor 12. The sulfur 18 can be present in the reactor 12 in any suitable form and size and shape. However, preferably the sulfur 18 is in finely divided particulate form so as to facilitate intimately mixing the same with the catalyst 14 in the reaction zone 12. Moreover, it is preferred that the granular size of the catalyst-sulfur mixture be controlled so as to readily allow the passage of carbon monoxide upwardly therethrough during the reaction. Accordingly, the catalyst is preferably present in a particle size range from a fine powder up to about ½ inch in diameter.

As shown in the accompanying single figure of the drawing, the reactor 12 is provided with an inlet line 20 and an outlet line 22 disposed at opposite ends of the reactor 12 and communicating with the interior of the reactor 12 through the otherwise closed bottom 24 and top 26, respectively, of the reactor 12. The inlet line 20 is connected with a pressurized source 28 of carbon monoxide, such as a pressure cylinder, and is provided with a heating means, such as the heating coils 30. As shown in the particular embodiment in the accompanying figure, a rotameter 32 is placed in the line 20 between the pressurized source (cylinder 28) of carbon monoxide and a two-way valve 34 in said line.

The gaseous effluent outlet line 22 runs from the top 26 of the reactor 12 to a chilled receiver (not shown) for separation and recovery of the carbonyl sulfide from the gaseous effluent passing from the reaction zone. Suitable pressure control means 36 are interposed in the line 22 between the reactor 12 and chilled receiver. The reactor 12 is also supplied with an indirect heat exchanger in the form of heating coils 38 disposed around the outside thereof, and a thermocouple 40 or other suitable means for measuring the temperature within the reaction zone. The seals (top cover 26 and bottom plate 24) at the top and bottom of the reactor 12 are adequate for maintaining a suitable pressure within the reactor during operation thereof. Thus, for example, a pressure of up to 400 p.s.i.g. or more can be employed, with usual pressures being about 150–300 p.s.i.g.

The reactor is also adapted to be operated at any suitable temperature of at least about 250° F. and below that temperature which would result in substantial carryover of vaporized sulfur in the gaseous effluent from the reaction zone at the desired pressure in the zone. Ordinarily, the reaction tempeature is maintained below about 400° F., specifically at between about 250° F. and about 350° F. so that no special high temperature equipment is necessary for the reaction. The minimum temperature is that temperature at the given pressure in the reactor which is at least sufficient to fluidize the sulfur. A suitable pressure is maintained in the reaction zone (reactor 12) during the reaction which is sufficient to assure sufficiently low vaporization of the sulfur at the selected temperature to limit the carryover of vaporized sulfur in the gaseous effluent from the reaction zone to a low enough level to avoid any complications with separate recovers of carbonyl sulfide and to eliminate sulfur fouling in the outlet line 22, valve 36 and chilled receiver. The pressure should be maintained at a sufficiently high level in order to facilitate intimate contacting between the carbon monoxide and the sulfur, but should be insufficient with respect to the temperature so as to cause substantial liquefaction of the carbonyl sulfide in the reactor 12. As previously indicated, in the range of about 250°–350° F., a pressure of at least about 100 p.s.i.g. has been found to be adequate for those purposes. Ordinarily, a pressure of not more than about 300 p.s.i.g. is utilized. However, the particular pressure can be varied, depending on the temperature, the size and type of reaction zone and supplementary equipment, etc.

Substantially pure carbon monoxide gas, or carbon monoxide gas containing any desired concentration of non-reactive diluent, for example, water gas containing $CO$ and $H_2$ or a mixture of $CO$ and $CO_2$ gas, is passed into the reaction zone 12 at any suitable gaseous flow rate, for example 1–5 s.c.f. per hour, as by control exerted by the rotameter 32, and is reacted in the reaction zone at the previously indicated temperature and pressure with fluidized sulfur, preferably liquid sulfur, to form carbonyl sulfide gas in the presence of the catalyst in the reaction zone. Relating the carbon monoxide flow rate to the catalyst concentration, normally in the present system gaseous space velocities for the carbon monoxide are about 100–10,000 s.c.f./s.c.f. of catalyst/hr. Any suitable CO-containing mixture can be used so long as the carbon monoxide is present in a substantial proportion in the gaseous mixture and so long as the other gases in the mixture do not interfere with the carbonyl sulfide reaction or react with the sulfur or impair the activity of the catalyst.

The reaction is as follows:

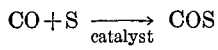

The carbon monoxide passes into the reaction zone under pressure through the inlet line 20 from the pressurized source 28 of carbon monoxide gas, and is heated during its passage through said line 20, as by heat transfer with the heating coils 30, so as not to substantially depress the reaction temperature in the reaction zone 12.

The carbonyl sulfide-containing gaseous effluent passes from the reaction zone through the outlet line 22 to the chilled receiver (not shown) or other recovery zone and contains therein the carbonyl sulfide gas. The gaseous effluent also contains unreacted CO, entrained or vaporized sulfur (if any) and inert gases (if any) such as $CO_2$ or the like. Carbonyl sulfide gas is obtained by the present method in a substantial concentration. For example, when carbon monoxide is continuously passed into the reactor 12 at a rate of 2 s.c.f. per hour, and when the reaction zone contains 100 milliliters of catalyst and 200 grams of sulfur and is operated at about 300° F. and at about 200 p.s.i.g., the carbonyl sulfide content in the effluent gas has been found to be about 17.4%, by weight. It has been demonstrated that if the same reaction is carried out in the absence of any catalyst no yield whatever of carbonyl sulfide is obtained. It has also been found that at temperatures of 350° F. and more the yield of carbonyl sulfide tends to substantially decrease, at an operating pressure of about 200 p.s.i.g. Accordingly, temperatures of the order of about 275° to 300° F. are preferred for maximum yield of carbonyl sulfide for suitable pressures, for example, of the order of about 200 p.s.i.g.

The following example further illustrates certain features of the invention.

EXAMPLE

A series of tests were carried out to determine optimum conditions for the production of carbonyl sulfide from sulfur and carbon monoxide according to the present method. The parameters and test results are set forth in the following table.

sulfur in the direct presence of the catalyst to form the gaseous carbonyl sulfide in relatively high yield. Such yields may vary from a few weight percent on a continuous through-put basis to 20 percent, by weight, or more on a batch basis, depending on reaction conditions, etc. Thus, as shown in the example, reaction temperatures below fluidization temperature for the sulfur result in no yield of carbonyl sulfide. Moreover, at 200 p.s.i.g., temperatures above about 320° F. result in a substantial decrease of yield, so that at about 400° F. the yield is very low. Best results are usually obtained at about 275–320° F., about 200 p.s.i.g. and at a CO throughput of 250–1500 s.c.f./s.c.f. catalyst/hr. space velocity.

The carbonyl sulfide gas can be recovered from the unreacted carbon monoxide and any other gaseous constituents or solids entrained in the effluent from the reaction zone by any suitable conventional recovery means, for example by contacting the carbonyl sulfide gas with diethyl amine or monoethyl amine, or the like selective absorbent, or by a procedure such as is set forth in copending United States patent application, Ser. No. 329,947, filed Dec. 12, 1963, entitled "Hydrocarbon Purification," of which George E. Hamm is the inventor, the assignee of which is the assignee of the present application. The particular method of recovery of the carbonyl sulfide gas from the effluent is not a part of the present invention.

The present method has particular and substantial advantages over conventional methods of preparing carbonyl sulfide. In this regard, the carbon monoxide need not be pure but can be present with hydrogen in a mixture known as water gas, or can be present with other gases, such as carbon dioxide or the like. The only requirement is that the gases in mixture with the carbon monoxide not be substantially greatly reactive with sulfur or with the catalyst under the reaction conditions. The present method operates at a relative low temperature and thus obviates the necessity of using high temperature, relatively expensive equipment, and handling techniques. Moreover, the present method results in the relatively rapid production and recovery of a relatively high concentration of carbonyl sulfide gas. There is no

| Run | Reactor | ° F. | P.s.i.g. | Sulfur (gms.) | Catalyst [2] (ml.) | CO (s.c.f.) | COS percent in effluent gas |
|---|---|---|---|---|---|---|---|
| A | Unstirred autoclave | 275 | 200 | 400 | 200 | 2.0 | 2.4 |
| B | Stirred autoclave | 304 | 200 | 200 | 100 | 1.0 | 17.4 |
| C | do | 275 | 200 | 200 | 100 | 1.0 | 9.9 |
| D | Tube [1] | 275 | 200 | 160 | None | 0.88 | None |
| E | do [1] | 275 | 200 | 160 | 28 | 1.5 | 22.5 |
| F | do [1] | 275 | 200 | 160 | 28 | 1.0 | 13.3 |
| G | do [1] | 275 | 200 | 100 | 100 | 1.0 | 10.3 |
| H | do [1] | 315 | 200 | 100 | 100 | 1.0 | 18.3 |
| I | do [1] | 350 | 200 | 100 | 100 | 1.0 | 3.3 |
| J | do [1] | 400 | 200 | 100 | 100 | 1.0 | 0.5 |
| K | do [1] | 225 | 200 | 100 | 100 | 1.5 | None |
| L | do [1] | 250 | 200 | 100 | 100 | 1.0 | 1.5 |

[1] Tube was substantially as shown in the accompanying drawings.
[2] Catalyst was cobalt oxide (3.3 wt. %) and molybdenum oxide (15.5 wt. %) on an alumina base, presulfied to cobalt sulfide-molybdenum sulfide on the alumina base.

A second parallel series of tests was run under the same conditions except for substituting 18 wt. percent cobalt sulfide catalyst on silica-alumina base and 250 p.s.i.g. pressure, with substantially identical results.

It will be understood that as shown in the above example, the reaction zone can comprise any suitable equipment, for example an unstirred or stirred autoclave (runs A, B and C), a tube or pipe (runs D–L) filled with the catalyst and sulfur mixture and sealed for pressurization, or other comparable equipment of any suitable size and shape. It will also be noted that the present method is carried out without any absorbing medium or adsorbing medium present in the reaction zone. Neither the catalyst nor the sulfur acts as an adsorber or absorber, nor does the carbon monoxide. Instead, the carbonyl sulfide-forming reaction takes place solely by reaction between the gaseous carbon monoxide and the liquefied or vaporized fouling of the catalyst, so that the method can be utilized on a substantially continuous basis very economically and does not need or utilize selected and specialized expensive absorbents, adsorbents or the like which require special handling techniques. The catalyst for the present method is readily available and inexpensive and durable. The sulfur and the carbon monoxide are also readily available. Moreover, pressure requirements for the method are minimal. Accordingly, the method is extremely simple, economical and efficient. Various other advantages of the present invention are set forth in the foregoing.

All modifications, changes, additions and substitutions in the present method, its steps, the equipment for carrying the steps out, the reactants and the parameters for the method as fall within the scope of the appended claims form a part of the present invention.

What is claimed is:

1. A low temperature method of preparing carbonyl sulfide, which method comprises reacting carbon monoxide gas and fluidized sulfur in the absence of an absorbing medium and in the absence of an adsorbing medium in a reaction zone in the presence of a catalyst comprising sulfied cobalt, sulfied molybdenum or mixtures thereof capable of catalyzing said reaction between said carbon monoxide and said sulfur to form carbonyl sulfide at a temperature between about 250° and about 400° F. said temperature being sufficient to fluidize said sulfur at the operating pressure in said reaction zone, and at super-atmospheric pressure between about 100 and about 400 p.s.i.g. said pressure being sufficient to maintain not more than a minor concentration of sulfur in the gaseous effluent from said zone at said temperature and sufficient to facilitate contact between said carbon monoxide and said sulfur, said pressure being insufficient to liquefy said carbonyl sulfide formed from said reaction, maintaining carbon monoxide gas and fluidized sulfur in said reaction zone at about said pressure and temperature during said reaction and passing gaseous carbonyl sulfide in the gaseous effluent from said zone.

2. The method of claim 1 wherein said sulfur and said catalyst are first introduced into said reaction zone in particulate form, wherein said sulfur is then fluidized at a temperature and pressure equivalent to between about 250° F. and about 350° F. and between about 100 and about 300 p.s.i.g. and thereafter gaseous carbonyl sulfide is passed from said zone to a recovery zone.

3. The method of claim 2 wherein said catalyst is maintained in said reaction zone as a fixed bed and wherein said carbon monoxide is continuously passed through said bed to react with the sulfur in said zone to form said carbonyl sulfide and wherein said carbonyl sulfide is continuously removed from said zone in the gaseous effluent from said reaction zone.

4. The method of claim 3 wherein said catalyst comprises a cobalt-containing sulfide and wherein said reaction is carried out at a temperature and pressure so as to maintain said sulfur in liquid form during said reaction.

5. The method of claim 4 wherein carbon monoxide is passed through said reaction zone at a gaseous space velocity of between about 100 and about 10,000 s.c.f./ s.c.f. of catalyst/hr.

6. The method of claim 4 wherein said carbon monoxide is passed through said reaction zone at a gaseous space velocity of between about 250 and about 1500 s.c.f./s.c.f. of catalyst/hour, wherein said temperature is between about 275° F. and about 320° F., and wherein said pressure is about 200 p.s.i.g.

7. The method of claim 6 wherein said catalyst cobalt sulfide-molybdenum sulfide on an alumina base.

8. The method of claim 7 wherein said sulfur is present in said reaction zone in a concentration of about 1–4 gms. per ml. of said catalyst and said carbon monoxide is passed therethrough at a gaseous flow rate of about 1 s.c.f. per 100 ml. of said catalyst.

9. The method of claim 8 wherein said catalyst is initially prepared before use in said reaction zone by presulfiding a mixture of 3.3 wt. percent of cobalt oxide and 15.5 wt. percent of molybdenum oxide disposed on an alumina base.

References Cited

UNITED STATES PATENTS

| | | | |
|---|---|---|---|
| 2,038,599 | 4/1936 | Pier et al. | 252—439 |
| 2,992,897 | 7/1961 | Applegath et al. | 23—203 |
| 3,235,333 | 2/1966 | Swakon | 23—203 |

EARL C. THOMAS, *Primary Examiner.*

H. S. MILLER, *Assistant Examiner.*

U.S. Cl. X.R.

23—288; 252—439